United States Patent
Park et al.

(10) Patent No.: US 11,840,262 B2
(45) Date of Patent: Dec. 12, 2023

(54) PRODUCTION FACTORY UNMANNED TRANSFER SYSTEM AND METHOD

(71) Applicants: HYUNDAI MOTOR COMPANY, Seoul (KR); KIA CORPORATION, Seoul (KR)

(72) Inventors: Jun Yeon Park, Gunpo-si (KR); Jihoon Park, Suwon-si (KR); Youngjin Jung, Cheonan-si (KR); Kyung Dong Park, Hwaseong-si (KR); David Oh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 230 days.

(21) Appl. No.: 17/406,957

(22) Filed: Aug. 19, 2021

(65) Prior Publication Data

US 2022/0073108 A1 Mar. 10, 2022

(30) Foreign Application Priority Data

Sep. 4, 2020 (KR) .................. 10-2020-0113343

(51) Int. Cl.
*B60W 60/00* (2020.01)
*G08G 1/0967* (2006.01)
(Continued)

(52) U.S. Cl.
CPC ........ *B60W 60/0051* (2020.02); *B60W 10/10* (2013.01); *B60W 10/18* (2013.01);
(Continued)

(58) Field of Classification Search
CPC .. B60W 60/0051; B60W 10/10; B60W 10/18; B60W 10/20; B60W 30/09;
(Continued)

(56) References Cited

U.S. PATENT DOCUMENTS 9,834,212 B2 12/2017 Park
10,877,474 B2 12/2020 Yun
(Continued)

FOREIGN PATENT DOCUMENTS

KR 20160009828 A 1/2016
KR 101755944 B1 7/2017
(Continued)

*Primary Examiner* — Alan D Hutchinson
(74) *Attorney, Agent, or Firm* — LEMPIA SUMMERFIELD KATZ LLC (57) ABSTRACT

A production factory unmanned transfer system includes: a vehicle, which connects Vehicle to Everything (V2X) communication with an infrastructure facility in a vehicle production factory and transfers a worker to a set destination in an unmanned manner through autonomous driving; and a road side unit, which is fixed around a road in the production factory to relay the V2X communication and which generates positioning error correction information based on high-precision Real Time Kinematic-Global Navigation Satellite System (RTK-GNSS) based on a fixed absolute coordinate and transmits the generated positioning error correction information to the vehicle. The vehicle includes a vehicle terminal, which controls autonomous driving according to a lane of a precise map based on high-precise positioning information obtained by correcting an error of satellite-based vehicle location information with the positioning error correction information.

14 Claims, 7 Drawing Sheets

(51) Int. Cl.
  *B60W 10/10*  (2012.01)
  *B60W 10/18*  (2012.01)
  *B60W 10/20*  (2006.01)
  *B60W 50/023*  (2012.01)
  *B60W 30/09*  (2012.01)
  *G01S 19/43*  (2010.01)
  *G01S 19/47*  (2010.01)
  *H04W 4/40*  (2018.01)

(52) U.S. Cl.
  CPC ............ *B60W 10/20* (2013.01); *B60W 30/09* (2013.01); *B60W 50/023* (2013.01); *G01S 19/43* (2013.01); *G01S 19/47* (2013.01); *G08G 1/096725* (2013.01); *G08G 1/096775* (2013.01); *G08G 1/096783* (2013.01); *H04W 4/40* (2018.02); *B60W 2420/42* (2013.01); *B60W 2420/52* (2013.01); *B60W 2420/54* (2013.01); *B60W 2556/60* (2020.02)

(58) Field of Classification Search
  CPC ........... B60W 50/023; B60W 2420/42; B60W 2420/52; B60W 2420/54; B60W 2556/60; B60W 2520/10; B60W 2540/01; B60W 2540/215; B60W 2554/00; B60W 2556/40; B60W 10/184; B60W 30/16; B60W 50/04; B60W 60/00253; B60W 2556/55; B60W 60/00256; B60W 30/14; B60W 30/181; B60W 40/02; B60W 40/105; B60W 60/00184; B60W 2520/04; B60W 2552/50; B60W 2556/50; B60W 2720/10; G01S 19/43; G01S 19/47; G01S 19/04; G01S 19/14; G01S 2013/9316; G01S 13/931; G01S 17/931; G01S 19/42; G08G 1/096725; G08G 1/096775; G08G 1/096783; G08G 1/096816; G08G 1/164; G08G 1/166; G08G 1/205; H04W 4/40; H04W 4/029; G05D 1/0022; G05D 1/0088; G05D 1/0238; G05D 1/0246; G05D 1/0257; G05D 1/027; G05D 1/0276; G05D 2201/0216; B60R 21/0134; B60Y 2300/18091; B60Y 2400/30

See application file for complete search history.

(56) References Cited

U.S. PATENT DOCUMENTS

| | | | |
|---|---|---|---|
| 2012/0022780 A1* | 1/2012 | Kulik | G01C 22/025 |
| | | | 701/498 |
| 2016/0016585 A1 | 1/2016 | Park | |
| 2017/0337813 A1* | 11/2017 | Taylor | G05D 1/0285 |
| 2019/0235515 A1* | 8/2019 | Shirvani | G05D 1/0221 |
| 2019/0259284 A1* | 8/2019 | Khadloya | G06V 10/25 |
| 2020/0117188 A1 | 4/2020 | Yun | |
| 2020/0133284 A1 | 4/2020 | Hur et al. | |
| 2020/0234574 A1 | 7/2020 | Park et al. | |
| 2020/0275605 A1* | 9/2020 | Chen | G05D 1/028 |
| 2020/0310440 A1* | 10/2020 | Ewert | G05D 1/0297 |
| 2021/0341629 A1* | 11/2021 | Kishimoto | G01S 19/07 |

FOREIGN PATENT DOCUMENTS

| | | | |
|---|---|---|---|
| KR | 20190128608 A | 11/2019 | |
| KR | 20190132526 A | 11/2019 | |
| KR | 20200046144 A | 5/2020 | |
| WO | WO-2022033867 A1 * | 2/2022 | G01S 19/44 |

* cited by examiner

FIG. 7 - Prior Art

PRODUCTION FACTORY UNMANNED TRANSFER SYSTEM AND METHOD

CROSS-REFERENCE TO RELATED APPLICATION

This application claims priority to and the benefit of Korean Patent Application No. 10-2020-0113343 filed in the Korean Intellectual Property Office on Sep. 4, 2020, the entire contents of which are incorporated herein by reference.

BACKGROUND

(a) Field of the Disclosure

The present disclosure relates to a production factory unmanned transfer system and method, and more particularly, to a production factory unmanned transfer system and method, which move a worker in an automobile production factory through a Vehicle to Everything (V2X) communication-based autonomous vehicle in an unmanned manner.

(b) Description of the Related Art

In general, in an automobile production factory, in order to transfer the produced, completed vehicle to a specific place, production and logistics work is in progress in which a number of workers are put in day/night and transfer vehicles.

Figure 7:
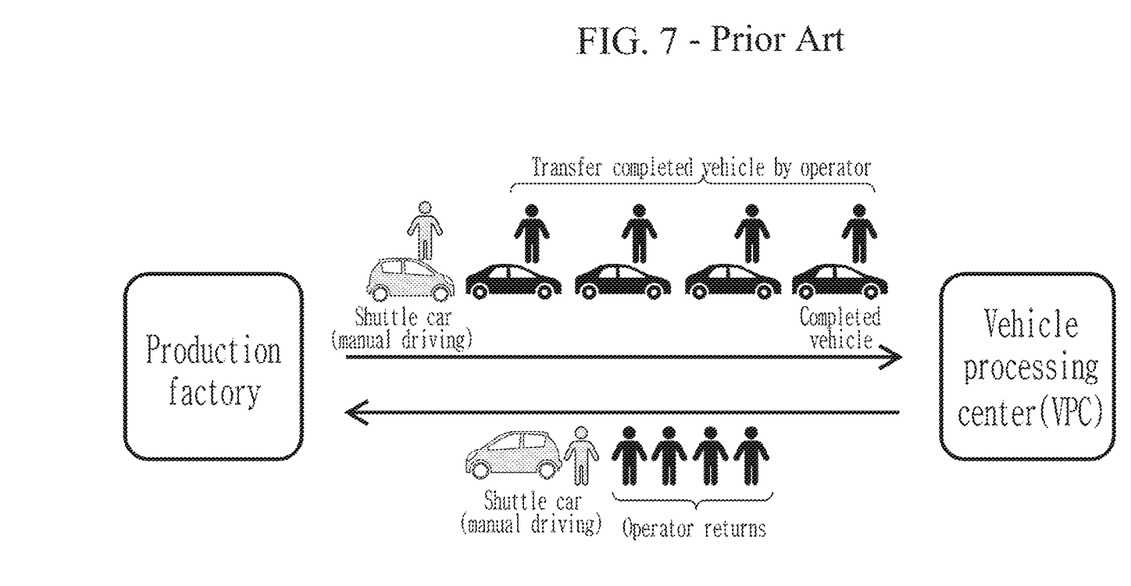
FIG. 7 schematically illustrates a method of transferring a vehicle within an automobile production factory in the related art.

For example, FIG. 7 schematically illustrates the existing method of transferring a vehicle within an automobile production factory.

Referring to FIG. 7, in the existing automobile production factory, in order to load the produced vehicle in a Vehicle Processing Center (VPC), a shuttle car is operated for the return of the worker after manual operation by the worker.

Recently, for the purpose of implementing a smart factory for a vehicle factory, research on automation of production lines is active. Also, interest is increasing in the application of autonomous driving to logistics transfer of vehicle components and unmanned transfer of a shuttle car.

Particularly, the shuttle car has increasing costs according to manual driving. Thus, in order to solve the problem, a method of transferring a worker in an unmanned shuttle method by utilizing an autonomous driving function of the vehicle has been recently proposed.

However, the unmanned shuttle method requires expensive equipment, such as lidar, to mount the autonomous driving function to the vehicle. Due to the nature of operation outdoors, there are problems of operational insecurity and securement of durability of the autonomous driving components due to weather/temperature and the like.

The above information disclosed in this Background section is only to enhance understanding of the background of the disclosure. Therefore. The Background section may contain information that does not form the prior art that is already known in this country to a person having ordinary skill in the art.

SUMMARY

The present disclosure has been made in an effort to provide an unmanned transfer system and method which support an autonomous driving function for unmanned transfer by providing a vehicle with high-precise positioning information using Vehicle to Everything (V2X) communication through a road side unit disposed in a factory.

The present disclosure has also been made in an effort to provide an unmanned transfer system and method which prevent safety accidents by controlling an unmanned transfer vehicle at a center and monitoring an operation state of the unmanned transfer vehicle through a control server.

An embodiment of the present disclosure provides a production factory unmanned transfer system. The system includes: a vehicle, which connects V2X communication with an infrastructure facility in a vehicle production factory and transfers a worker to a set destination in an unmanned manner through autonomous driving; and a road side unit, which is fixed around a road in the production factory to relay the V2X communication and which generates positioning error correction information based on high-precision Real Time Kinematic-Global Navigation Satellite System (RTK-GNSS) based on a fixed absolute coordinate and transmits the generated positioning error correction information to the vehicle. The vehicle includes a vehicle terminal, which controls autonomous driving according to a lane of a precise map based on high-precise positioning information obtained by correcting an error of satellite-based vehicle location information with the positioning error correction information.

Further, the production factory unmanned transfer system may include a control server, which generates driving information for the unmanned transfer of the vehicle and transmits the generated operation information through the road side unit, and which collects state information from each of the vehicle and the road side unit and monitors operation states.

Further, the road side unit may include a V2X module, which establishes Vehicle-to-Infra (V2I) communication with the vehicle, establishes Infra-to-Infra (I2I) communication with the control server and relays transceived data, and establishes a private V2X communication network in the production factory.

Further, the road side unit may include: a Global Navigation Satellite System (GNSS correction module), which generates an absolute coordinate of a fixed location and estimates an error distance of a GNSS measurement value through real-time error modelling estimation, and which generates a high-precise RTK-GNSS positioning error correction information for correcting the error distance; a monitoring camera, which photographs a surrounding area and monitors a road environment and a moving vehicle; a detection module, which includes at least one detection equipment between a radar or a lidar and detects road environment and obstacle occurrence information through radio wave emission; a sensor module, which includes at least one of a temperature sensor, an infrared sensor, or a gyro sensor and senses surrounding environment information and change in an installation location of the road side unit; and a control module, which transmits the positioning error correction information to the vehicle through the V2I wireless communication at a cycle of 8 Hz.

Further, the control module may monitor a surrounding road state and obstacle occurrence of obstacles in autonomous driving through the monitoring camera and the detection module and may transmit the detected information to the vehicle and the control server.

Further, the control module may transmit the surrounding environment information and the information in the change of the installation location of the road side unit measured in the sensor module to the control server.

Further, the vehicle may include: a V2X communication unit, which connects V2I communication with the road side unit; an autonomous driving sensor unit, which includes at least one of a camera, a radar, an ultrasonic wave sensor, and a precise GNSS, and which monitors a driving environment; a vehicle control unit, which includes at least one of an electronic transmission control unit for shift control of the vehicle, a redundant braking module for braking control, or a motor driven power steering module for steering control; a vehicle terminal, which performs autonomous driving control to a set destination in a precise map of a navigation system when a start signal is input from a start switch or a control server; and a vehicle communication unit, which connects the vehicle control unit, the V2X communication unit, and the vehicle terminal.

Further, the autonomous driving sensor unit may be complemented through combination with an obstacle and a driving possible area recognized by using image recognition technology through deep learning of the camera, information on a distance from a surrounding object, a speed, and a direction measure by using the radar, and information about a road environment and obstacle occurrence detected in the road side unit and enhance recognition information.

Further, the precise GNSS may correct an error according to a surrounding environment by using two or more multi-bands among a Global Positioning System (GPS), a Global Orbiting Navigational Satellite System (GLONASS), and Galileo.

Further, the precise GNSS may reflect dead reckoning and estimates a current location according to a movement route from a departure point and a vehicle speed, and correct errors by utilizing an Inertial Measurement Unit (IMU) and a wheel tick sensor.

Further, the redundant braking module may include: a braking actuator, which pulls backward a brake pedal through driving of a motor according to a control signal and mechanically operates the brake pedal; and a Smart Cruise Control, which controls a vehicle speed, acceleration/deceleration, and stop according to the control signal.

Further, the vehicle may include a start switch for inputting a start signal and a stop switch for inputting an emergency stop signal, which may be configured in a button type.

Further, the vehicle terminal may collect vehicle state information including at least one of a vehicle ID, corrected high-precise positioning information, operation state information of the autonomous driving sensor unit, operation state information of the vehicle control unit, a Diagnostic Trouble Code (DTC), software (S/W) version information, or real-time driving image data during the autonomous driving of the vehicle, and may transmit the collected vehicle state information to the control server through the road side unit.

Further, the control server may include: a transception unit, which collects state information according to operations of the vehicle and the road side unit; a vehicle inspection unit, which analyzes the state information of the vehicle and recognizes failure according to the DTC and inspects operation states of the autonomous driving sensor unit and the vehicle control unit; a road side unit inspection unit, which analyzes the state information of the road side unit and inspects network traffic information, such as radio interference, access to unauthorized equipment, signal strength, service availability, the amount of usage, or response time; a database (DB), which converts the information collected from the vehicle and the road side unit and analyzed information obtained by processing the collected information into a DB and stores the converted information; and a central processing unit, which generates driving information including at least one of a destination, a driving route, a driving vehicle speed, a start control signal, a start signal, or a stop signal for controlling the autonomous driving and transmits the generated information to the vehicle.

Further, the central processing unit may compare each sensor value of the autonomous driving sensor unit received as the state information of the vehicle with a normal reference value according to a corresponding autonomous driving condition and, when the comparison result is not included in an allowance range, the central processing unit may emergently stop the vehicle according to an accident prediction detection.

Further, when a reception Packet Error Rate (PER) of the V2X wireless communication, the number of frames per second (fps) and the number of pixels of the monitoring camera, satellite signal sensitivity of the precision GNSS, and the number of satellites are not included in defined normal reference values (thresholds), respectively, the central processing unit may emergently stop the vehicle according to the accident prediction detection.

Another embodiment of the present disclosure provides a method of transferring a worker in vehicle in an unmanned manner, where the vehicle is connected to a road side unit of a production factory through V2X communication. The method includes: a) setting driving information required for unmanned transfer between a production factory and a vehicle processing center based on driving information received from a control server as an autonomous control condition and starting autonomous driving when a start signal is input; b) reflecting RTK-GNSS-based positioning error correction information received from a road side unit to vehicle location information measured through a precise GNSS and correcting the vehicle location information to high-precise positioning information; c) collecting detection information using an autonomous driving sensor unit and obstacle detection information received from the road side unit and detecting a surrounding situation; and d) when the vehicle arrives at a destination of a driving route set with the driving information, terminating autonomous driving.

Further, operation b) may include: monitoring a surrounding obstacle by operating the autonomous driving sensor unit including a camera, a radar, an ultrasonic wave sensor, or a precise GNSS; and, when there is no surrounding obstacle, operating a vehicle control unit including a transmission control unit, a redundant braking module, and a steering module in accordance with the driving information including a destination, a driving route, and a driving speed and controlling autonomous driving.

Further, in operation c), the redundant braking module may include: a braking actuator that mechanically operates a brake pedal by pulling the brake pedal backward by driving a motor according to a control signal; and a Smart Cruise Control that controls a vehicle speed, acceleration/deceleration, and stop according to the control signal.

Further, operation c) may include emergently stopping the vehicle when obstacle occurrence is detected through the autonomous driving sensor unit, information about the occurrence of an obstacle in the front is received from the road side unit, or an emergency stop signal according to an accident prediction determination is received from the control server during the autonomous driving.

According to an embodiment of the present disclosure, a worker in a production factory is moved in an unmanned manner through the V2X communication-based autonomous driving vehicle. Thus, there is an effect of reducing labor costs caused by manual driving and preventing human errors caused by careless driving in the related art.

Further, there is an effect of reducing communication costs required for autonomous driving control of the vehicle by establishing a private V2X communication network in the production factory and by securing reliability of communication quality according to the establishment of an in-house dedicated V2X communication network.

Further, there is an effect of supporting safe autonomous driving of the vehicle in which a lidar is deleted and enhancing the monitoring of the autonomous driving by correcting a location information error of the vehicle through the infrastructure of the RSU and by sharing surrounding detection information with the vehicle and the control server.

DETAILED DESCRIPTION OF THE EMBODIMENTS

In the following detailed description, only certain embodiments of the present disclosure are shown and described simply by way of illustration. As those having ordinary skill in the art should realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", should be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, in describing the constituent elements of the present inventive concept, the terms of a first, a second, A, B, (a), (b), or the like, can be used, but the constituent elements should not be limited by the terms. Such a term is only for discriminating the constituent element from another constituent element and does not limit the essential feature. Thus, the nature, sequence, or order of the component is not limited by the term.

Throughout the specification, it should be understood that when one constituent element referred to as being "coupled to" or "connected to" another constituent element, one constituent element can be directly coupled to or connected to the other constituent element, but intervening elements may also be present. In contrast, when one constituent element is referred to as being "directly coupled to" or "directly connected to" another constituent element, it should be understood that there are no intervening elements present.

The terms used in the present specification are simply used for describing a specific embodiment and are not intended to limit the present disclosure. A singular expression includes a plural expression unless it is specifically described to the contrary in the context.

All terms used herein including technical or scientific terms have the same meanings as meanings which are generally understood by those having ordinary skill in the art unless they are differently defined in the present specification. Terms defined in a generally used dictionary should be construed such that they have meanings matching those in the context of a related art. Such terms should not be construed in ideal or excessively formal meanings unless they are clearly defined in the present specification.

When a component, device, element, or the like of the present disclosure is described as having a purpose or performing an operation, function, or the like, the component, device, or element should be considered herein as being "configured to" meet that purpose or to perform that operation or function.

Now, a production factory unmanned transfer system and method according to an embodiment of the present disclosure are described in detail with reference to the drawings.

Figure 1:
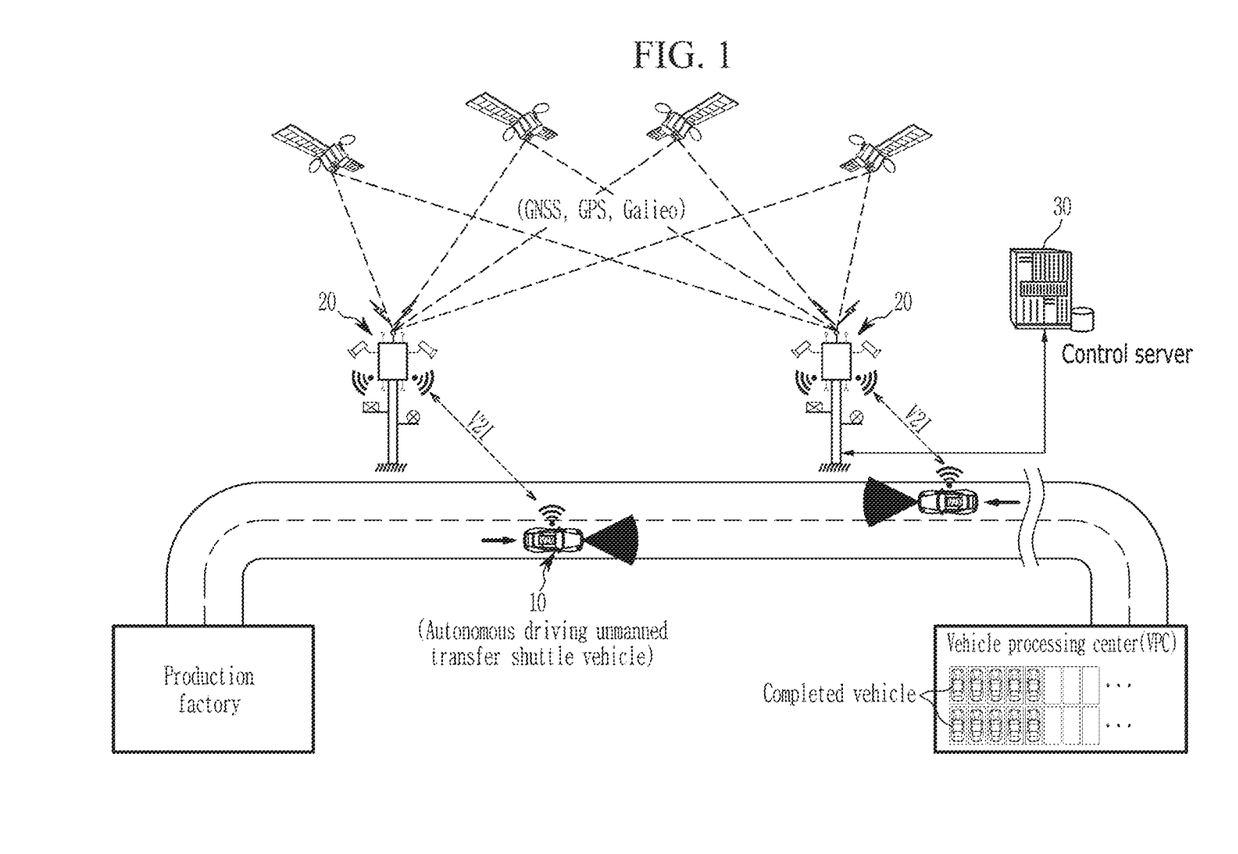
FIG. 1 is a network configuration diagram schematically illustrating a production factory unmanned transfer system according to an embodiment of the present disclosure.

FIG. 1 is a network configuration diagram schematically illustrating a production factory unmanned transfer system according to an embodiment of the present disclosure.

Referring to FIG. 1, the production factory unmanned transfer system according to an embodiment of the present disclosure includes a vehicle 10, which connects Vehicle to Everything (V2x) communication with an infrastructure facility in an automobile production factory and transfers a worker to a set destination through autonomous driving in an unmanned manner. The production factory unmanned transfer system further includes a road side unit (RSU) 20, which is an infrastructure facility that is fixed around the road and relays the V2X communication and which generates positioning error correction information based on high-precision Real Time Kinematic-Global Navigation Satellite System (RTK-GNSS) based on a fixed absolute coordinate. The RSU 20 transmits the generated positioning error correction information to the vehicle 10. A control server 30 generates driving information for unmanned transfer at a center and transmits the generated driving operation to the vehicle 10 through the RSU 20 and collects state information about the vehicle 10 through the RSU 20 and monitors an operation state of the vehicle 10.

The vehicle 10 performs unmanned operation of setting a Vehicle Processing Center (VPC) as a destination in the production factory, moving to a destination by autonomous driving, and returning a worker boarding in the VPC to the production factory.

Herein, the vehicle 10 refers to a shuttle car for transferring the worker who manually drives a completed vehicle produced in the production factory and moves the vehicle to the VPC.

The RSU 20 serves as a communication base station, which connects the vehicle 10 existing within a coverage and the control server 30 through V2X communication at a fixed location. The RSU 20 may transmit state information according to the operation of the vehicle 10 to the control server 30 and may transmit a control command of the control server 30 to the vehicle 10.

Figure 2:
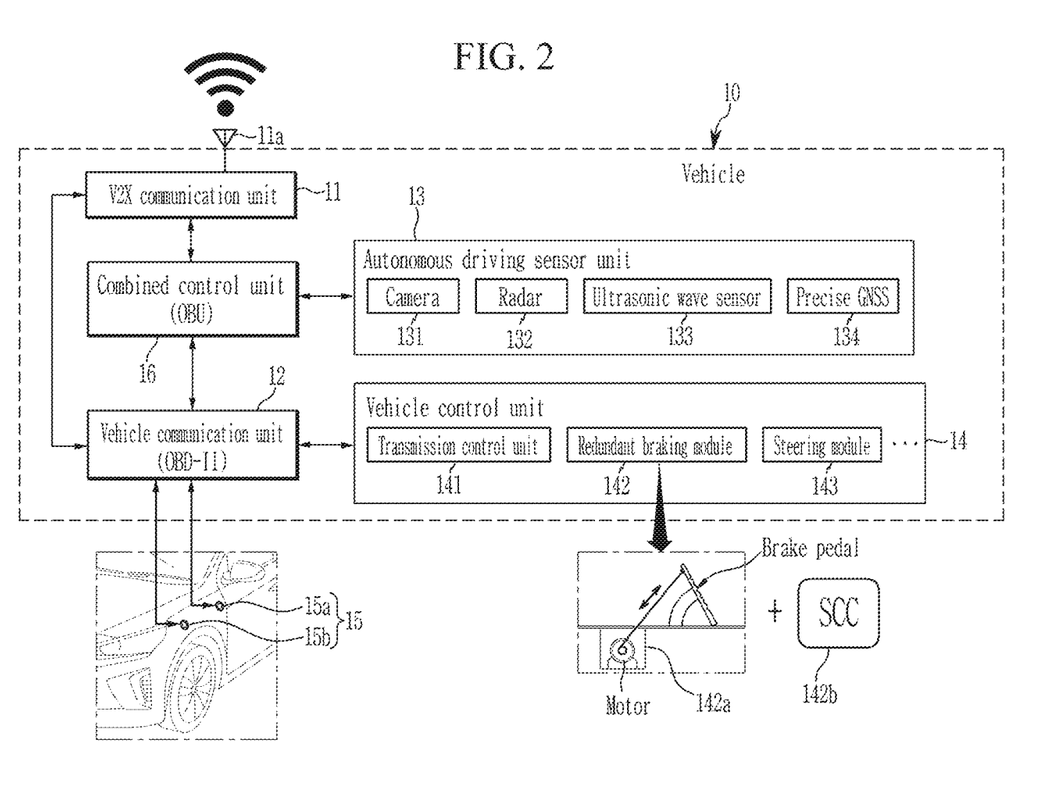
FIG. 2 is a block diagram schematically illustrating a configuration of a vehicle according to an embodiment of the present disclosure.

FIG. 2 is a block diagram schematically illustrating a configuration of a vehicle according to an embodiment of the present disclosure.

Referring to FIG. 2, the vehicle 10 according to an embodiment of the present disclosure includes a V2X communication unit 11, a vehicle communication unit (OBD-II) 12, an autonomous driving sensor unit 13, a vehicle control unit 14, and a vehicle terminal 16.

The V2X communication unit 11 refers to all types of wireless communication technology applicable to the vehicle 10 on the road and includes Vehicle-to-Infra (V2I), Vehicle-to-Vehicle (V2V), Vehicle-to-Nomadic Devices (V2N), and the like.

The V2X communication unit 11 maintains V2I communication connection with the RSU 20 that covers a corresponding vehicle location during travelling through a combined antenna 11*a*.

The vehicle communication unit 12 may be formed of the OBD-II device and may serve as an interface that connects the configuration of the vehicle control unit 14 for operation control, such as speed changing, braking, and steering, of the vehicle, the V2X communication unit 11, and the vehicle terminal 16.

The vehicle communication unit 12 may be connected through at least one of a Controller Area Net (CAN), a Local Interconnect Network (LIN), FlexRay, and Ethernet.

Further, the vehicle communication unit 12 may communicate with the external RSU 20 by using wireless communication (LTE/5G/WiFi) separately from the V2X communication unit 11. The vehicle communication unit 12 prevents the communication between the vehicle 10 and the infrastructure facility from being disconnected in the event of failure in the V2X communication unit 11 or an emergency.

The autonomous driving sensor unit 13 monitors a driving environment based on location information of the vehicle for autonomous driving and may include a camera 131, a radar 132, an ultrasonic wave sensor 133, and a precise Global Navigation Satellite System (GNSS) 134. Herein, the autonomous driving sensor unit 13 may delete (omit) the expensive lidar used in the existing autonomous driving and enhance the detection function using the camera 131 and the radar 132. Further, performance of detecting surrounding obstacles may be supplemented through sharing of the information of the lidar/radar installed in the RSU 20 which is described below.

The camera 131 recognizes obstacles in front while travelling and checks a drivable area (lane) of the road by using image recognition technology through deep learning. The camera 131 may be installed at each of the front side and both sides of the vehicle 10.

The radar 132 generates electromagnetic waves in the front and discriminates and recognizes other vehicles and pedestrians in the vicinity through a reflected signal. In this case, the radar 132 may extract distance, speed, and direction information from surrounding objects, and may recognize the corresponding object as a vehicle, a pedestrian, a fixed structure, an animal, and the like through fusion, i.e., combination with the information recognized through the camera 131 to enhance a recognition function. This may be described as enhancing the recognition function by complementing the function of each of the camera 131 and the radar 132 through fusion or combination in the structure in which the expensive lidar is deleted in the vehicle 10.

The ultrasonic wave sensor 133 is installed in plural along the edge of the vehicle 10 and detects the surroundings of the departure and arrival points.

The precise GNSS 134 measures real-time vehicle location information regarding location, altitude, speed, and the like by using an artificial satellite. The real-time vehicle location information is reflected to the autonomous driving control which is described below, so that minimizing errors and precise positioning are required.

Accordingly, the precise GNSS 134 may minimize errors according to the surrounding environment, such as a tunnel, a building, and a mountain, by using a multiband system or technology, such as a Global Positioning System (GPS), a Global Orbiting Navigational Satellite System (GLONASS), and Galileo.

Further, the precise GNSS 134 may reflect dead reckoning and estimate a current location according to a movement route from the departure point and a vehicle speed and may correct errors by utilizing an Inertial Measurement Unit (IMU) and a wheel tick sensor.

The vehicle control unit 14 includes various control modules required for controlling autonomous driving of the vehicle.

For example, the vehicle control unit 14 includes an electronic Transmission Control Unit (TCU) 141 for shift control of the vehicle, a redundant braking module 142 for braking control, a Motor Driven Power Steering (MDPS) module 143 for steering control, and the like.

The redundant braking module 142 includes a braking actuator 142*a* that mechanically operates the brake pedal by pulling the brake pedal backward by driving a motor according to a control signal and includes a Smart Cruise Control (SCC) 142*b* that controls a vehicle speed, acceleration/deceleration, and stop according to the control signal.

Herein, the fact that deceleration and stop using the SCC 142*b* is possible may suggest that at least one of Electronic Control Suspension (ECS) for electronic acceleration/deceleration control and Electronic Stability Control (ESC) for braking control is provided. In the autonomous driving vehicle, the brake is the most important element for safety for passengers. Accordingly, by duplexing the braking device, it is possible to travel at a constant vehicle speed through the braking actuator 142*a* at normal times and to perform deceleration and stop control by using the SCC 142*b* when an error occurs. Further, the braking actuator 142*a* is located at the rear of the brake pedal. Thus, there is an advantage in that a general braking operation is possible even by the pedal effort of the driver in the emergency situation or when the vehicle 10 is manually driven.

The operation switch unit 15 is formed of a button type in the vehicle itself, and includes a start switch 15*a* for inputting a start signal, and a stop switch 15*b* for inputting an emergency stop signal.

The start switch 15*a* and the stop switch 15*b* may also be formed inside the vehicle and may input a start/stop command of the vehicle according to a worker's manipulation of the switch to the vehicle terminal 16.

The vehicle terminal 16 controls the general operation of each unit of the vehicle 10 for the production factory unmanned transfer and stores at least one program and data in a memory for the general control.

The vehicle terminal 16 may be referred to as an On Board Unit (OBU) as a corresponding term due to the characteristic of interlocking with the RSU 20 around the road for the safe autonomous driving control of the vehicle 10 and monitoring thereof.

When a start command is input from the start switch 15*a* or the control server 30, the vehicle terminal 16 performs the autonomous driving control to a destination (for example, vehicle processing center/production factory) set in the precision map of the navigation system.

The vehicle terminal 16 receives positioning error correction information (RTCM) in real time through V2I communication connected with the RSU 20 and corrects an error range of the vehicle location information measured in the precise GNSS 134 into high-precise positioning information of 10 cm or less. Through this, the vehicle terminal 16 may perform the precise autonomous driving control along the center of the lane width of the precision map based on the error-corrected high-precise positioning information.

When the vehicle terminal 16 receives driving information including at least one of a destination, a driving route, a vehicle driving speed, starting ON/OFF, start/stop, or emergency stop for the unmanned transfer from the control server 30, the vehicle terminal 16 operates the autonomous driving sensor unit 13 and the vehicle control unit 14 and controls the autonomous driving.

The vehicle terminal 16 collects state information of the vehicle during the autonomous driving of the vehicle 10 and transmits the collected state information of the vehicle to the control server 30 through the RSU 20. For example, the state information may include at least one of an ID of the vehicle, the corrected high-precise positioning information, operation state information of each sensor of the autonomous driving sensor unit 13, operation state information of each control module of the vehicle control unit 14, Diagnostic Trouble Code (DTC), software (S/W) version information, or and real-time driving image data.

In this case, the RSU 20 may extract the vehicle ID and the high-precise positioning information existing in its coverage from the state information and may provide the vehicle 10 with obstacle information of the road environment detected in the infrastructure facility, such as the monitoring camera, the radar, and the lidar.

Accordingly, there is an advantage in that the vehicle 10 is capable of collecting the surrounding environment detection information and the obstacle detection information of the infrastructure facility by using the autonomous driving sensor unit 13 thereof and performing the safe autonomous driving control without the lidar.

Figure 3:
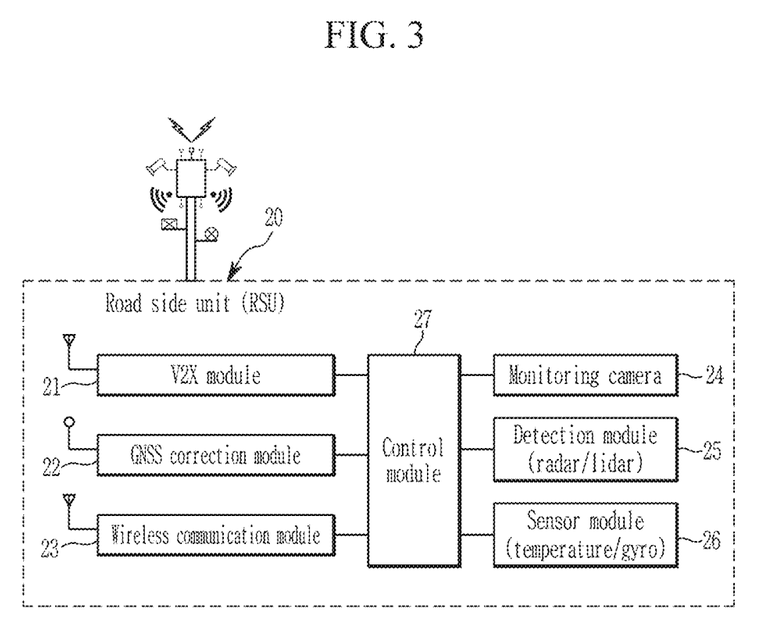
FIG. 3 is a block diagram schematically illustrating a configuration of a road side unit according to an embodiment of the present disclosure.

FIG. 3 is a block diagram schematically illustrating a configuration of the RSU according to an embodiment of the present disclosure.

Referring to FIG. 3, the RSU 20 according to an embodiment of the present disclosure includes a V2X module 21, a GNSS correction module 22, a wireless communication module 23, a monitoring camera 24, a detection module 25, a sensor module 26, and a control module 27.

The V2X module 21 establishes V2I communication with the vehicle 10 and is connected with the control server 30 through Infra-to-Infra (I2I) to relay transceived data.

The GNSS correction module 22 always generates an absolute coordinate (altitude, latitude, and longitude) through 24 positions at the fixed location of the RSU 20. The GNSS correction module 22 also estimates an error distance due to the space atmosphere ion layer, satellite orbit error, and convective layer refraction through real-time error modelling estimation. Further, the GNSS correction module 22 generates high-precision RTK-GNSS positioning error correction information for correcting the error distance.

The wireless communication module 23 relays wireless communication with the vehicle 10 and the control server 30. However, the production factory unmanned transfer system according to an embodiment of the present disclosure establishes a private V2X communication network to relay the vehicle 10 and the control server 30. Thus, the wireless communication module 23 may be omitted and may be utilized as an emergency communication means in case of emergency as necessary.

The monitoring camera 24 photographs the surroundings of the RSU 20 and monitors a road environment and moving vehicles. Also, for example, the monitoring camera 24 may track a road environment event, such as image-based road state transformation (damage), rainy roads, snowy roads, ice roads, traffic signals, congestion, construction, and the appearance of obstacles, and a specific vehicle (for example, an accident or broken vehicle).

The detection module 25 includes at least one detection equipment between radar or lidar and detects the road environment event, such as road state transformation (damage) of the vehicle, pedestrian detection, construction section, or the appearance of fixed or moving obstacles, through radio wave emission.

Further, the detection module 25 may emit a lidar signal, obtain a three-dimensional image within a detection area, and monitor a distance, a movement direction, and a speed of the detected vehicle 10.

The sensor module 26 includes at least one of a temperature sensor, an infrared sensor, or a gyro sensor and recognizes a road weather environment and a change in an installation location, such as dropping and inclination of the RSU 20.

The control module 27 stores a program and data for controlling the operation of the RSU 20 in a memory and includes a processor for the control.

The control module 27 transmits the positioning error correction information generated in the GNSS correction module 22 to the vehicle 10 at a period of 8 Hz (8 times/sec) through V2I wireless communication.

Further, the control module 27 may monitor the road state, the appearance of the obstacle, and the like that are obstacles to autonomous driving through the monitoring camera 24 and the detection module 25 and transmit the detected information to the vehicle 10 and the control server 30.

Further, the control module 27 may transmit the surrounding environment information and the installation location change information of the RSU 20 measured in the sensor module 26 to the control server 30.

Figure 4:
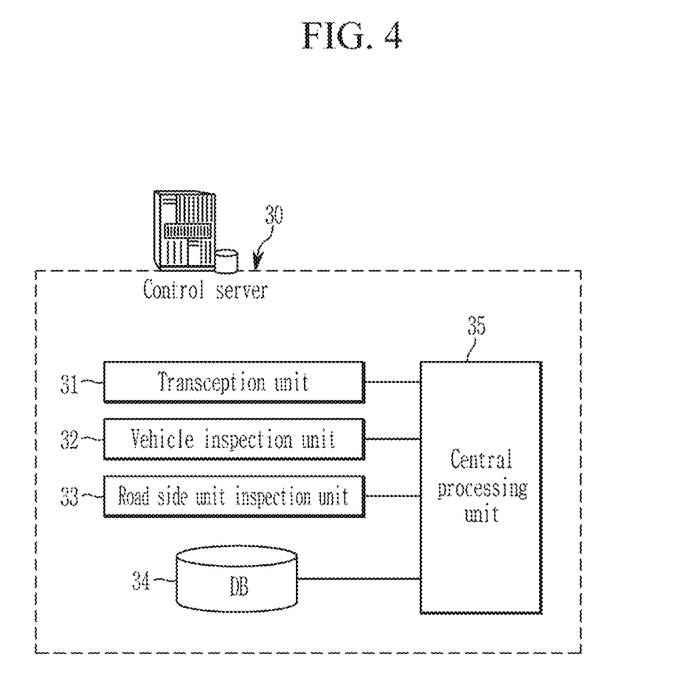
FIG. 4 is a block diagram schematically illustrating a configuration of a control server according to an embodiment of the present disclosure.

FIG. 4 is a block diagram schematically illustrating a configuration of the control server according to an embodiment of the present disclosure.

Referring to FIG. 4, the control server 30 according to the embodiment of the present disclosure includes a transception unit 31, a vehicle inspection unit 32, an RSU inspection unit 33, a database (DB) 34, and a central processing unit 35.

The transception unit 31 transmits driving information for the control of autonomous driving of the vehicle 10 and collects state information according to the operation of the vehicle through the RSU 20.

The transception unit 31 may further collect state information according to network traffic detection of the RSU 20. The state information may be received with data in which a vehicle ID is matched with an RSU ID.

The vehicle inspection unit 32 analyzes the state information of the vehicle and recognizes failure according to a Diagnostic Trouble Code (DTC), and inspects operation states of the autonomous driving sensor unit 13 and the vehicle control unit 14.

The vehicle inspection unit 32 may generate a vehicle management table, such as an inspection result, a component replacement, and a maintenance history, for each vehicle ID for the vehicle 10 that is being operated in the factory and may store the generated the vehicle management table in the DB 34.

The RSU inspection unit 33 analyzes the state information of the RSU and inspects network traffic information, such as radio interference, access to unauthorized equipment, signal strength, service availability, the amount of usage, or response time.

Similar to the vehicle inspection unit 32, the RSU inspection unit 33 may generate a vehicle management table, such as an inspection result, a component replacement, or a maintenance and repair history for each vehicle ID for the vehicle 10 that is being operated in the factory and store the generated RSU management table in the DB 34.

The DB 34 stores various programs and data for monitoring the vehicle 10 and the RSU 20 in the factory of the control server 30 and stores data generated according to the operation.

The DB 34 may convert various state information collected from the vehicle 10 and the RSU 20 and analyzed information obtained by processing the state information into a DB and store the converted information.

The central processing unit 35 includes at least one processor controlling a general operation of each unit for monitoring the production factory unmanned transfer system.

The central processing unit 35 may remotely control the operation states of all of the vehicles 10 in the factory through the private V2X network established through the RSU 20.

In this case, the central processing unit 35 generates driving information including at least one of a destination, a driving route, a driving vehicle speed, start ON/OFF, start/stop, or emergency stop for the unmanned transfer and transmits the generated operation information to the vehicle 10.

The central processing unit 35 defines a normal reference value (threshold) by learning the V2X communication data received according to the normal autonomous driving condition and each sensor value of the autonomous driving sensor unit 13 and estimates a vehicle accident based on the normal reference value (threshold). In other words, when the state information of the vehicle is received, the central processing unit 35 compares each sensor value of the autonomous driving sensor unit with the normal reference value (threshold) according to the corresponding autonomous driving condition. When the comparison result is not included in an allowance range, the central processing unit 35 may control emergency stop according to the estimation of an accident.

For example, when a reception Packet Error Rate (PER) of the V2X wireless communication, the number of frames per second (fps) and the number of pixels of the camera 131, satellite signal sensitivity of the precision GNSS 134, and the number of satellites are not included in the defined normal reference values (thresholds), respectively, the central processing unit 35 may detect accident prediction.

Further, the central processing unit 35 may recognize information, such as obstacle and pedestrian detection, weather abnormality, and abnormal driving of the autonomous driving device (movement abnormality/lane departure), using the detection data of the RSU 20 and may detect accident prediction in advance.

When the accident prediction or the accident occurrence event is generated, the central processing unit 35 may display the generated accident prediction or accident occurrence event on the monitoring screen and make an alarm to the terminal of the operator.

Further, the central processing unit 35 includes an encryption algorithm for preventing hacking and may encrypt and transceive V2X wireless communication data through the RSU 20 and may set an operator access right in the server.

The central processing unit 35 monitors the vehicle 10 and the RSU 20 operated in the production factory and the infrastructure facility, such as the road in real time, and displays the result of the monitoring to the operator through the monitoring screen.

Figure 5:
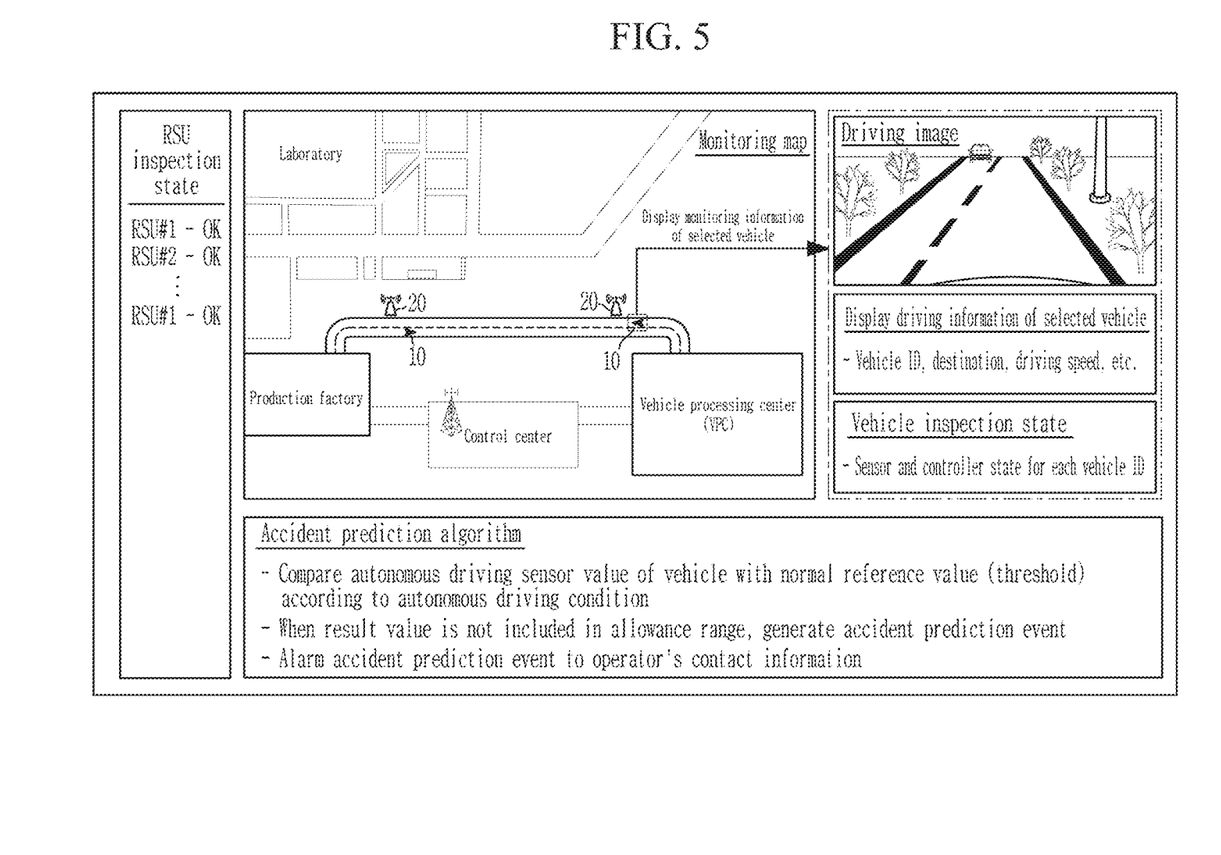
FIG. 5 illustrates a monitoring screen of the control server according to an embodiment of the present disclosure.

For example, FIG. 5 illustrates the monitoring screen of the control server according to an embodiment of the present disclosure.

Referring to FIG. 5, the central processing unit 35 may display a vehicle inspection state of the vehicle inspection unit 32 and an RSU inspection state of the RSU inspection unit 33 on the monitoring screen.

In this case, the central processing unit 35 may check a S/W version of the autonomous driving sensor unit 13 and the vehicle control unit 14 of the vehicle 10 and provide a remote update service. Further, the central processing unit 35 may check an S/W version installed in the RSU 20 and provide a remote update service.

The central processing unit 35 may display a real-time vehicle location and driving state on the monitoring screen based on the state information of the vehicle collected through the RSU 20.

The central processing unit 35 may display a real-time vehicle location to which the corrected high-precise positioning information and driving speed for each vehicle ID is reflected on the precision map based on the state information of the vehicle collected through the RSU 20. In this case, when any one vehicle is selected or a vehicle in which an accident occurs is selected by the operator, the central processing unit 35 displays real-time driving image data received from the corresponding vehicle on the monitoring screen. Further, the central processing unit 35 may display a tracking image of the selected vehicle collected through the RSU 20 on the monitoring screen.

A production factory unmanned transfer method according to an embodiment of the present disclosure is described below based on the configuration of the production factory unmanned transfer system.

Figure 6:
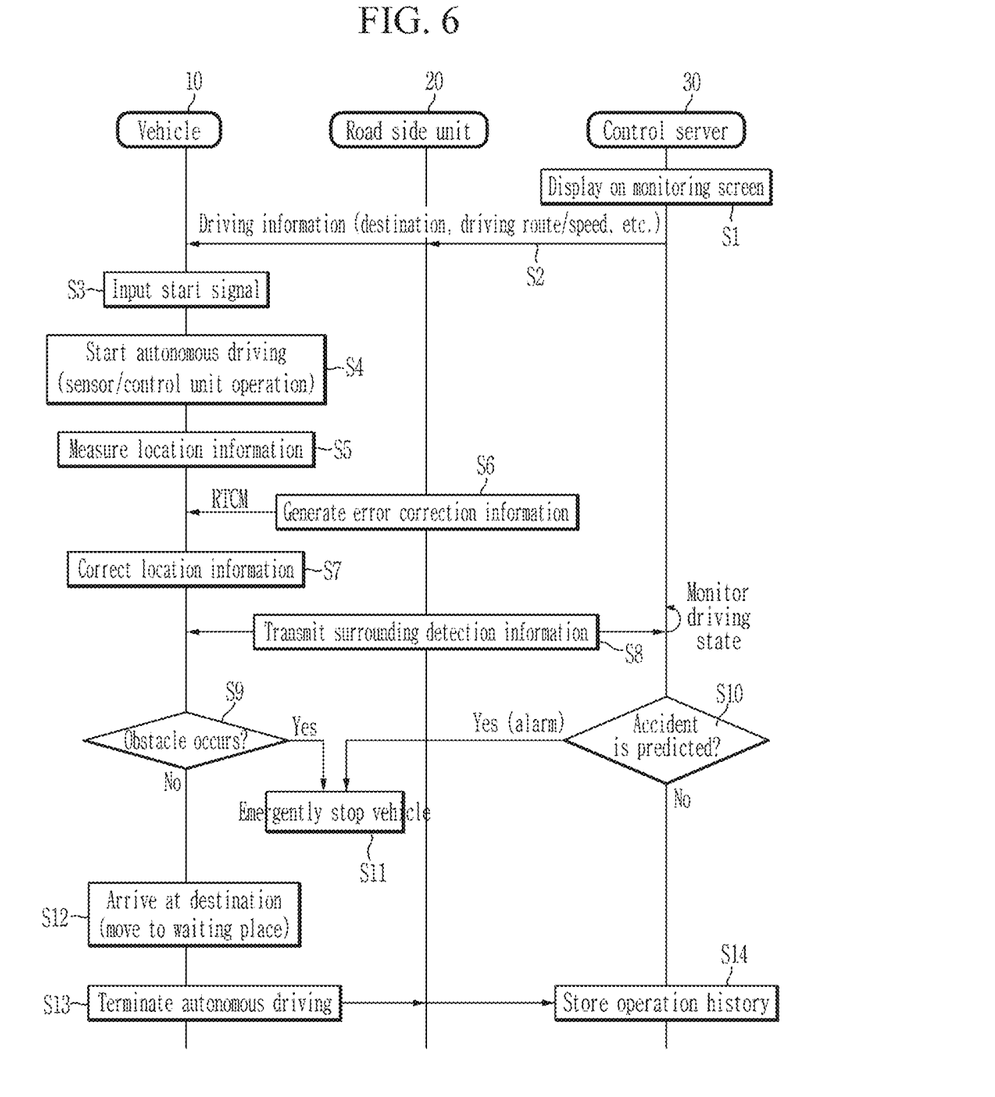
FIG. 6 is a flowchart schematically illustrating a production factory unmanned transfer method according to an embodiment of the present disclosure.

FIG. 6 is a flowchart schematically illustrating a production factory unmanned transfer method according to an embodiment of the present disclosure.

Referring to FIG. 6, the control server 30 connects V2X communication with the vehicle 10 through the RSU 20 and displays the connection on the monitoring screen to be monitored at the central (S1).

The control server 30 selects the vehicle 10 required for unmanned transfer between the production factory and a VPC, sets driving information, such as a destination, a driving route, and a driving speed, and transmits the set operation information to the vehicle 10 (S2). The destination may be set to the VPC or the production factory according to the current location of the vehicle.

In the meantime, the vehicle 10 sets the driving information received from the control server 30 as an autonomous driving control condition (S3), and when a start signal is input, the vehicle 10 starts autonomous driving (S4). The start signal may be input through a manipulation of the start switch 15*a* installed in the vehicle itself or input from the control server 30. In this case, the vehicle 10 operates the autonomous driving sensor unit 13 including the camera 131, the radar 132, the ultrasonic wave sensor 133, and the precision GNSS 134 and monitors whether there is a surrounding obstacle. When there is no surrounding obstacle, the vehicle 10 operates the vehicle control unit 14 including the TCU 141, the redundant braking module 142, and the steering module 143 in accordance with the driving information and may control the autonomous driving.

The vehicle 10 measures location information of the vehicle through the precision GNSS 134 (S5).

In the meantime, the RSU 20 generates high-precision RTK-GNSS positioning error correction information for correcting an error distance of the location information of the vehicle and transmits the generated high-precision RTK-GNSS positioning error correction information to the vehicle 10 (S6).

The vehicle 10 reflects the received positioning error correction information to the location information of the vehicle and corrects the location information to the high-precise positioning information in which an error range is 10 cm or less (S7). Accordingly, the vehicle 10 may more precisely and safely control the autonomous driving based on the error-corrected high-precise positioning information.

The RSU 20 transmits detection information obtained by detecting the area around the road by using the monitoring camera 24 and the detection module 25 to the vehicle 10 and the control server 30 (S8).

Accordingly, the vehicle 10 collects the detection information using the autonomous driving sensor unit 13 and the obstacle detection information received from the RSU 20 to closely detect the surrounding situation even in the absence of a lidar. Further, the control server 30 may more accurately track the driving state on the road of the vehicle based on the high-precise positioning information of the vehicle and the received obstacle detection information.

In the meantime, when the vehicle 10 detects the occurrence of an obstacle or receives information about the occurrence of an obstacle in the front from the RSU 20 during autonomous driving (YES in S9), the vehicle 10 performs an emergency stop (S11).

Further, the control server 30 compares each sensor value received as the state information of the vehicle with a normal reference value (threshold) according to the corresponding autonomous driving condition. When the comparison value is determined as an accident prediction (YES in S10), the control server 30 may make an alarm to the operator and emergently stop the vehicle 10 (S11). Herein, in the emergency stop, in the case of a temporary event, such as a pedestrian or a construction section, excluding extreme situations in which abnormality in the autonomous driving function of the vehicle 10 has occurred, the autonomous driving may restart by removing the obstacle or receiving a reset driving route from the control server 30.

When the vehicle 10 arrives at the destination of the set driving route (S12), the vehicle 10 moves to a waiting place, turns off the engine or motor, and ends the autonomous driving (S13).

When the control server 30 receives an autonomous driving end message from the vehicle, the control server 30 matches an operation history of an ID of the corresponding vehicle and data collected as the detection information and stores the matched data in the DB 34 (S14).

In the foregoing, embodiments of the present inventive concept have been described. However, the present disclosure is not limited only to the embodiments described and, thus, other various modifications are possible.

The embodiments of the present disclosure are described based on that the vehicle 10 is unmanned transferred between the production factory (design factory) and the VPC through autonomous driving, but the present disclosure is not limited thereto. The present disclosure is applicable to logistics transfer between a precedent process and a subsequent process in the production factory, which should be apparent to those of ordinary skill in the art.

Further, by adding multiple routes between destinations, it is also possible to build an unmanned transfer system for vehicles which circulate large-scale site facilities, such as vehicle manufacturing factories or universities.

As described above, according to an embodiment of the present disclosure, a worker in a production factory is moved in an unmanned manner through the V2X communication-based autonomous driving vehicle. Thus, there is an effect of reducing labor costs caused by manual driving and preventing human errors caused by careless driving in the related art.

Further, there is an effect of reducing communication costs required for autonomous driving control of the vehicle by establishing a private V2X communication network in the production factory and by securing reliability of communication quality according to the establishment of an in-house dedicated V2X communication network.

Further, there are effects of supporting safe autonomous driving of the vehicle in which a lidar is omitted, of enhancing the monitoring of the autonomous driving by correcting a location information error of the vehicle through the infrastructure of the RSU, and of sharing surrounding detection information with the vehicle and the control server.

Embodiments of the present disclosure are not implemented only through the device and/or method described above. The disclosure may be implemented through a program for implementing a function corresponding to the configuration of an embodiment of the present disclosure, a recording medium in which the program is recorded, and the like. The implementation may be easily realized by those having ordinary skill in the art based on the description of the embodiment.

Although embodiments of the present disclosure have been described in detail, the scope of the present disclosure is not limited by such embodiments. Various changes and modifications using the basic concept of the present disclosure defined in the accompanying claims by those having ordinary skill in the art should be construed to belong to the scope of the present disclosure.

DESCRIPTION OF SYMBOLS

10: Vehicle
11: V2X communication unit
12: Vehicle communication unit (OBD-II)
13: Autonomous driving sensor unit
131: Camera
132: Radar
133: Ultrasonic wave sensor
134: Precision GNSS
14: Vehicle control unit
141: Transmission Control Unit
142: Redundant braking module
143: Steering module
15*a*: Start switch
15*b*: Stop switch 16: Vehicle terminal (OBU)
20: Road Side Unit (RSU)
21: V2X module
22: GNSS correction module
23: Wireless communication module
24: Monitoring camera
25: Detection module
26: Sensor module
27: Control module
30: Control server
31: Transception unit
32: Vehicle inspection unit
33: RSU inspection unit
34: DB
35: Central processing unit

What is claimed is:

1. A production factory unmanned transfer system, the system comprising:
a vehicle, which connects Vehicle to Everything (V2X) communication with an infrastructure facility in a vehicle production factory and transfers a worker to a set destination in an unmanned manner through autonomous driving;
a road side unit, which is fixed around a road in the production factory to relay the V2X communication and which generates positioning error correction information based on high-precision Real Time Kinematic-Global Navigation Satellite System (RTK-GNSS) based on a fixed absolute coordinate and transmits the generated positioning error correction information to the vehicle; and
a control server that generates driving information for the unmanned transfer of the vehicle, that transmits the generated operation information through the road side unit, that collects state information from each of the vehicle and the road side unit, and that monitors operation states,
wherein the vehicle includes a vehicle terminal, which controls autonomous driving according to a lane of a precise map based on high-precise positioning information obtained by correcting an error of satellite-based vehicle location information with the positioning error correction information, and
wherein the control server includes
a transception unit that collects state information according to operations of the vehicle and the road side unit,
a vehicle inspection unit that analyzes the state information of the vehicle and recognizes failure according to the DTC, and that inspects operation states of the autonomous driving sensor unit and the vehicle control unit,
a road side unit inspection unit that analyzes the state information of the road side unit and inspects network traffic information, including one or more of radio interference, access to unauthorized equipment, signal strength, service availability, the amount of usage, or response time,
a database (DB) that converts the information collected from the vehicle and the road side unit and analyzed information obtained by processing the collected information into a DB and stores the converted information, and
a central processing unit that generates driving information including at least one of a destination, a driving route, a driving vehicle speed, a start control signal, a start signal, or a stop signal for controlling the autonomous driving and that transmits the generated information to the vehicle.

2. The system of claim 1, wherein:
the road side unit includes a V2X module, which establishes Vehicle-to-Infra (V2I) communication with the vehicle, establishes Infra-to-Infra (I2I) communication with the control server and relays transceived data, and establishes a private V2X communication network in the production factory.

3. The system of claim 2, wherein the road side unit includes:
a Global Navigation Satellite System (GNSS) correction module, which generates an absolute coordinate of a fixed location and estimates an error distance of a GNSS measurement value through real-time error modelling estimation, and which generates a high-precise RTK-GNSS positioning error correction information for correcting the error distance;
a monitoring camera, which photographs a surrounding area and monitors a road environment and a moving vehicle;
a detection module, which includes at least one detection equipment between a radar or a lidar and detects road environment and obstacle occurrence information through radio wave emission;
a sensor module, which includes at least one of a temperature sensor, an infrared sensor, or a gyro sensor and which senses surrounding environment information and change in an installation location of the road side unit; and
a control module, which transmits the positioning error correction information to the vehicle through the V2I wireless communication at a cycle of 8 Hz.

4. The system of claim 3, wherein:
the control module monitors a surrounding road state and obstacle occurrence of obstacles in autonomous driving through the monitoring camera and the detection module and transmits the detected information to the vehicle and the control server.

5. The system of claim 3, wherein:
the control module transmits the surrounding environment information and the information in the change of the installation location of the road side unit measured in the sensor module to the control server.

6. The system of claim 1, wherein the vehicle includes:
a V2X communication unit, which connects V2I communication with the road side unit;
an autonomous driving sensor unit, which includes at least one of a camera, a radar, an ultrasonic wave sensor, or a precise GNSS, and which monitors a driving environment;
a vehicle control unit, which includes at least one of an electronic transmission control unit for shift control of the vehicle, a redundant braking module for braking control, or a motor driven power steering module for steering control;
a vehicle terminal, which performs autonomous driving control to a set destination in a precise map of a navigation system when a start signal is input from a start switch or a control server; and
a vehicle communication unit, which connects the vehicle control unit, the V2X communication unit, and the vehicle terminal.

7. The system of claim 6, wherein:
the autonomous driving sensor unit is complemented through combination with an obstacle and a driving possible area recognized by using image recognition technology through deep learning of the camera, information on a distance from a surrounding object, a speed, and a direction measure by using the radar, and information about a road environment and obstacle occurrence detected in the road side unit and enhances recognition information.

8. The system of claim 6, wherein:
the precise GNSS corrects an error according to a surrounding environment by using two or more multi-bands among a Global Positioning System (GPS), a Global orbiting Navigational Satellite System (GLONASS), and Galileo.

9. The system of claim 6, wherein:
the precise GNSS reflects dead reckoning and estimates a current location according to a movement route from a departure point and a vehicle speed and corrects errors by utilizing an Inertial Measurement Unit (IMU) and a wheel tick sensor.

10. The system of claim 6, wherein the redundant braking module includes:
a braking actuator, which pulls backward a brake pedal through driving of a motor according to a control signal and mechanically operates the brake pedal; and
a Smart Cruise Control, which controls a vehicle speed, acceleration/deceleration, and stop according to the control signal.

11. The system of claim 6, wherein:
the vehicle further includes a start switch for inputting a start signal and a stop switch for inputting an emergency stop signal, which are configured in a button type.

12. The system of claim 1, wherein:
the vehicle terminal collects vehicle state information including at least one of a vehicle ID, corrected high-precise positioning information, operation state information of the autonomous driving sensor unit, operation state information of the vehicle control unit, a Diagnostic Trouble Code (DTC), software (S/W) version information, or real-time driving image data during the autonomous driving of the vehicle, and transmits the collected vehicle state information to the control server through the road side unit.

13. The system of claim 1, wherein:
the central processing unit compares each sensor value of the autonomous driving sensor unit received as the state information of the vehicle with a normal reference value according to a corresponding autonomous driving condition and, when the comparison result is not included in an allowance range, the central processing unit emergently stops the vehicle according to an accident prediction detection.

14. The system of claim 13, wherein:
when a reception Packet Error Rate (PER) of the V2X wireless communication, the number of frames per second (fps) and the number of pixels of the monitoring camera, satellite signal sensitivity of the precision GNSS, and the number of satellites are not included in defined normal reference values (thresholds), respectively, the central processing unit emergently stops the vehicle according to the accident prediction detection.

* * * * *